United States Patent
Kwak et al.

(10) Patent No.: US 6,977,711 B2
(45) Date of Patent: Dec. 20, 2005

(54) LIQUID CRYSTAL DISPLAY

(75) Inventors: Sang-Ki Kwak, Suwon (KR);
Kwon-Young Choi, Seoul (KR);
Young-Jae Tak, Suwon (KR);
Myung-Jae Park, Kwangju (KR);
Woon-Yong Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 62 days.

(21) Appl. No.: 09/983,878

(22) Filed: Oct. 26, 2001

(65) Prior Publication Data
US 2002/0051114 A1    May 2, 2002

(30) Foreign Application Priority Data
Oct. 27, 2000   (KR) ............................... 2000-63451

(51) Int. Cl.[7] .............................................. G02F 1/13
(52) U.S. Cl. ........................... 349/192; 349/42; 349/54
(58) Field of Search .......................... 349/192, 42, 138, 349/54; 257/72

(56) References Cited

U.S. PATENT DOCUMENTS

| | | | | |
|---|---|---|---|---|
| 5,530,568 A | * | 6/1996 | Yamamoto et al. | 359/54 |
| 5,886,762 A | * | 3/1999 | Lee et al. | 349/141 |
| 5,907,379 A | * | 5/1999 | Kim et al. | 349/141 |
| 6,028,442 A | * | 2/2000 | Lee et al. | 324/770 |
| 6,252,643 B1 | | 6/2001 | Song | 349/139 |
| 6,256,076 B1 | * | 7/2001 | Bae et al. | 349/38 |
| 6,310,667 B1 | * | 10/2001 | Nakayoshi et al. | 349/42 |
| 6,335,770 B1 | * | 1/2002 | Komatsu | 349/38 |
| 6,337,726 B1 | * | 1/2002 | Kawano et al. | 349/141 |
| 6,340,963 B1 | * | 1/2002 | Anno et al. | 345/92 |
| 6,429,918 B1 | * | 8/2002 | Choi et al. | 349/111 |
| 6,433,764 B1 | * | 8/2002 | Hebiguchi et al. | 345/87 |
| 6,441,401 B1 | * | 8/2002 | Jung et al. | 257/72 |
| 6,483,565 B1 | * | 11/2002 | Hidehira et al. | 349/141 |
| 6,633,359 B1 | * | 10/2003 | Zhang et al. | 349/141 |

(Continued)

FOREIGN PATENT DOCUMENTS

JP    3-59534    *   3/1991

(Continued)

Primary Examiner—Nathan J. Flynn
Assistant Examiner—Ahmed N. Sefer
(74) Attorney, Agent, or Firm—McGuireWoods LLP

(57) ABSTRACT

An LCD having a plurality of test pads applied with a common voltage, covered with respective shielding conductor or located sufficiently far from pixels. A gate wire including pluralities of gate lines and test pads disconnected from the gate lines and located near one ends of the gate lines, and a common electrode wire including a plurality of common electrodes and a common electrode pad connected to the common electrode electrodes are formed on a substrate, and covered with a gate insulating film. A data wire and a pixel electrode wire are formed thereon and covered with a passivation film. The passivation film and the gate insulating film have contact holes exposing the test pads and the common electrode pad. A plurality of connecting members which are connected to the test pads and the common electrode pad through the contact holes are formed on the passivation film. Alternatively, the passivation film and the gate insulating layer have contact holes exposing only the common electrode pad, and a plurality of shielding members are provided on the passivation layer to be connected to the common electrode pad and to cover the test pads. Alternatively, the distance between the gate lines and the test pads is equal to or larger than twice the width of the pixel.

17 Claims, 4 Drawing Sheets

U.S. PATENT DOCUMENTS

| | | | |
|---|---|---|---|
| 2001/0012086 A1 * | 8/2001 | Ohta et al. | 349/143 |
| 2002/0018149 A1 * | 2/2002 | Kanayama | 349/1 |
| 2002/0018176 A1 * | 2/2002 | Kobayashi et al. | 349/200 |
| 2002/0044227 A1 * | 4/2002 | Lee | 349/40 |
| 2003/0090604 A1 * | 5/2003 | Song et al. | 349/56 |
| 2004/0233344 A1 * | 11/2004 | Ohgiichi et al. | 349/40 |
| 2004/0239826 A1 * | 12/2004 | Park et al. | 349/43 |

FOREIGN PATENT DOCUMENTS

| | | | |
|---|---|---|---|
| JP | 8-110509 | * | 4/1996 |
| JP | 10-197891 | * | 7/1998 |
| JP | 11-272189 | * | 10/1999 |
| JP | 11-311808 | * | 11/1999 |
| JP | 2000-56324 | * | 2/2000 |
| JP | 2001-235725 | * | 8/2003 |

* cited by examiner

LIQUID CRYSTAL DISPLAY

BACKGROUND OF THE INVENTION (a) Field of the Invention

The present invention relates to a liquid crystal display (written as LCD hereinafter), and more particularly, to an LCD of coplanar electrode mode (referred to as CE mode hereinafter) mode.

(b) Description of the Related Art

A CE mode LCD has a pair of panels, one of which has pluralities of pixel electrodes and common electrodes thereon. A plurality of liquid crystal molecules disposed between the two panels are driven by horizontal electric field generated by the pixel electrodes and the common electrodes, thereby obtaining wide viewing angle.

A plurality of pixel areas, being defined by the area enclosed by two adjacent gate lines and two adjacent data lines, are arranged in a matrix in a display area of a lower panel of a CE mode LCD. The pixel area has a switching element electrically connected to the gate lines and the data lines, a pixel electrode electrically connected to the switching element, and a common electrode cooperating with the pixel electrode to generate horizontal electric field. In a peripheral area, a plurality of gate pads connected to respective one ends of the gate lines, a plurality of data pads connected to respective one ends of the data lines, and a common electrode pad connecting the common electrodes of the pixel regions.

Color filters of red (R), green (G) and blue (B), and a black matrix between the color filters are formed on an upper panel of the CE mode LCD opposite to the pixel areas of the lower panel.

In the meantime, a panel test for inspecting circuital defects of the LCD is executed nearly before the completion of the manufacturing process. As a preparation for the panel test, during the manufacturing steps of the LCD, one ends of the gate lines are connected together, and a plurality of test pads are formed at the other ends of the gate lines.

In the panel test, two gate lines are selected and a test voltage is applied to the test pads of the selected gate lines to inspect defects of the pixels connected to the two gate lines. In this way, the panel test is executed on all the gate lines.

After the panel test of the LCD, all the gate lines are separated while the test pad are still remained.

The test pads connected to the gate lines are applied with gate voltages during the operation of the LCD. Since the gate off voltage (for example, −7 volts) is much different from the common voltage (for example, 5 volts) and the test pads have much larger width than the gate lines, the electric field from the test pads distorts the fields in the pixels adjacent to the test pads when the gate off voltage is applied to the test pad. In addition, the electric field from the test pads induces local polarization in the black matrix, which is very different from that due to the electric fields in the pixels, and thus significantly distorts the electric field in the pixels, thereby causing light-leakage.

SUMMARY OF THE INVENTION

An object of the present invention is to realize more stable image quality by minimizing light-leakage.

To achieve the above object, the present invention disconnects test pads from gate lines and apply a common voltage to the separated test pads, or covers test pads with shielding members of the common voltage, or locates test pads by a distance equal to or larger than twice the width of the pixels.

According to the present invention, a liquid crystal display includes a plurality of pixels, and each pixel has first and second field generating electrodes for generating electric fields to control liquid crystal materials. The LCD also includes a first signal wire transmitting scanning signals to the pixels and a second signal wire transmitting image signals to the pixels. A plurality of test pads are provided for inspecting defects of at least the first signal wire. The second field generating electrodes is applied with a common voltage. According to the present invention, at least one of the test pads is connected to the common voltage, or covered with a shielding member applied with the common voltage, or located away from the pixels adjacent to the test pad by a distance equal to or larger than twice width of the pixels.

According to an aspect of the present invention, the test pads are preferably disconnected from the gate lines, and the first and the second field generating electrodes are preferably located on the same side as the test pads.

The liquid crystal display according to the present invention, each pixel may further include a switching element connected to the first and the second signal wire and the first field generating electrodes.

According to another aspects of the present invention, the distance between the test pad and the pixels adjacent to the test pads is preferably equal to or larger than 200 microns.

A liquid crystal display panel according to an aspect of the present invention includes a plurality of pixel electrodes and a plurality of common electrodes on a substrate. The pixel electrodes and the common electrodes cooperate to generate electric fields for controlling liquid crystal materials. Pluralities of gate lines and data line for transmitting gate signals and data signals, respectively, are provided on the substrate. A plurality of switching elements are also provided and each switching elements is connected to one of the gate lines, one of the data lines and one of the pixel electrodes. A plurality of test pads are also formed on the substrate near one ends of the gate lines. According to the present invention, at least one of the test pads is applied with the common voltage or covered with a shielding member of the common voltage.

The test pads are preferably formed of the same layer as the gate lines, and the test pads are disconnected to the gate lines after the test pads are once connected thereto for test of the panel. The LCD may further include a common electrode pad connected to the common electrodes, and it is preferable that the test pad is electrically connected to the common electrode pad to be applied with the common voltage. The LCD may further include a connecting member connecting the test pad to the common electrode pad, and an insulating layer covering the test pad and the common electrode pad. The insulating layer preferably has first and second contact holes exposing the test pad and the common electrode pad, respectively, and the connecting member is connected to the test pad and the common electrode pad through the first and the second contact holes, respectively.

The shielding member is preferably applied with the common voltage. The LCD according to the present invention may further include a common electrode pad connected to the common electrodes, and the shielding member is electrically connected to the common electrode pad. Furthermore, the LCD may further include an insulating layer covering the test pad and the common electrode pad and having a contact hole exposing the common electrode pad, and the shielding member is preferably connected to the common electrode pad through the contact hole.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE PREFERRED EMBODIMENTS

Figure 1:
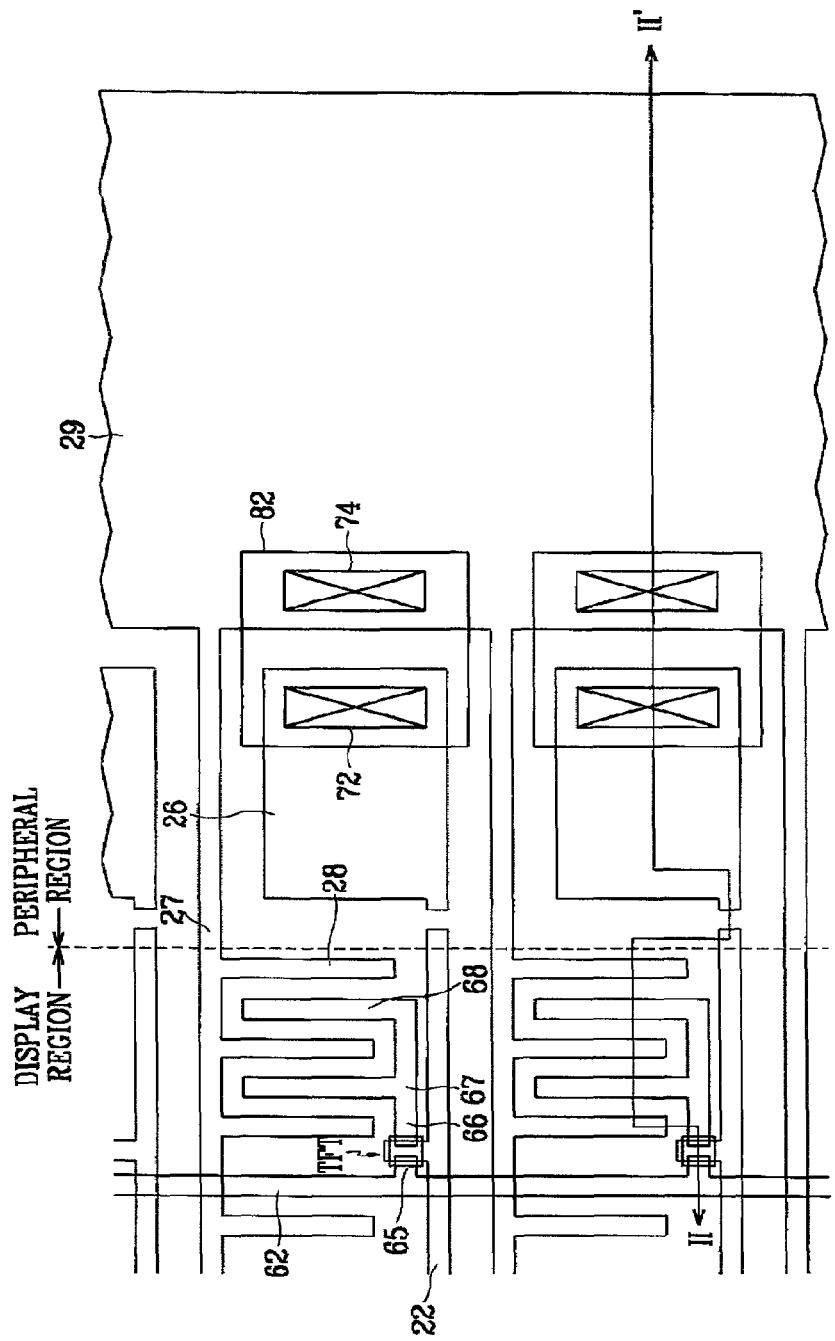
FIG. 1 is a layout view showing a liquid crystal display according to a first preferred embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
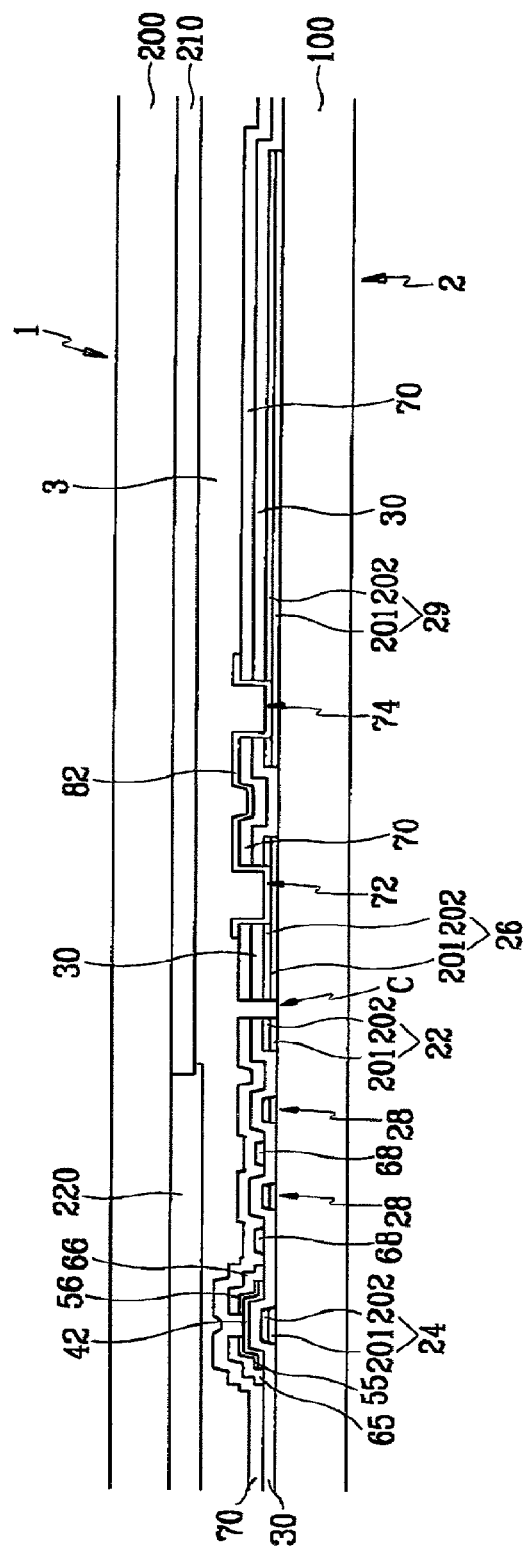
FIG. 2 is a cross-sectional view of an LCD taken along the line II–II' in FIG. 1.

FIG. 1 is a layout view of a lower panel of a liquid crystal display (written as LCD hereinafter) according to a first preferred embodiment of the present invention, and FIG. 2 is a cross-sectional view of the liquid crystal display taken along the line II–II' in FIG. 1.

The structure of an LCD according to a first preferred embodiment of the present invention will be hereinafter described in detail with reference to FIGS. 1 and 2.

As shown in FIG. 2, the LCD according to this embodiment includes upper and lower panels 1 and 2 facing each other, and, as shown in FIG. 1, is divided into two regions, a display region and a peripheral region. For convenience of description, FIGS. 1 and 2 show only the portion near the boundary between the display region and the peripheral region, and FIG. 1 shows only a lower panel 2.

First, the structure of the lower panel 2 is described with reference to FIGS. 1 and 2.

In the display region of the lower panel 2, a gate wire 22, 24 and 26 and a common electrode wire 27, 28 and 29, both having a dual-layered structure, are formed on a lower substrate 100, and the dual layer includes a lower metal layer 201 of chrome or molybdenum and an upper metal layer 202 of aluminum.

The gate wire 22, 24 and 26 includes a plurality of gate lines 22 extending in the transverse direction, a plurality of gate pads (not shown) formed at one ends of the gate lines 22 for receiving gate signals from external driving circuits, a plurality of gate electrodes 24 which are branches of the gate lines 22, and a plurality of test pads 26 adjacent to but separated from the other ends of the gate lines 22.

The gate lines 22 and the test pads 26 are formed to be connected in the manufacturing process, but, as shown in FIG. 1, are separated from each other after a defect test of the LCD.

The common electrode wire 27, 28 and 29 includes a plurality of common electrode lines 27 parallel to the gate lines 22 and disposed between the gate lines 22, a plurality of common electrode branches 28 diverging from the common electrode lines 27, and a common electrode pad 29 connecting the common electrode lines 27.

The gate wire 22, 24 and 26 and the common electrode wire 27, 28 and 29 are covered with a gate insulating film 30 of insulating material such as silicon nitride.

A semiconductor pattern 42 of such as amorphous silicon is formed on the gate insulating film 30, and an ohmic contact layer 55 and 56 of semiconductor doped with impurities, such as amorphous silicon doped with n type impurities, is formed on the semiconductor pattern 42.

A data wire 62, 65 and 66 and a pixel electrode wire 67 and 68 made of conducting material are formed on the gate insulating layer 30 and the ohmic contact layer 55 and 56.

The data wire 62, 65 and 66 includes a plurality of data lines 62, a plurality of data pads (not shown), and pluralities of source electrodes 65 and drain electrodes 66 separated from each other.

The data lines 62 extend in the longitudinal direction to intersect the gate lines 22, and the data pads for receiving data signals from external driving circuits is located at one ends of the data lines 62. The source electrodes 65 are branches of the data lines 62, and the source and the drain electrodes 65 and 66 are opposite with respect to the gate electrodes 24 and contact two separated portions 55 and 56 of the ohmic contact layer, respectively.

The pixel electrode wire 67 and 68 includes a plurality of pixel electrode lines 67 and a plurality of pixel electrode branches 68 diverging from the pixel electrode lines 67. The pixel electrode lines 67 are parallel to the common electrode lines 27 and connected to the drain electrodes 66, while the pixel electrode branches 68 are parallel to the common electrode branches 28.

The data wire 62, 65 and 66 and the pixel electrode wire 67 and 68 are covered with a passivation film 70 of insulating material such as silicon nitride.

A plurality of separating holes C for electrically separating the gate lines 22 from the test pads 26 are provided by the passivation film 70, the gate insulating film 30 and the gate lines 22.

Moreover, pluralities of first contact holes 72 and second contact holes 74 exposing the test pads 26 and the common pad 29, respectively, are provided by the passivation film 70, the gate insulating film 30 and the upper metal layers 202 of the test pads 26 and the common electrode pad 29, respectively.

A plurality of connecting members 82 formed on the passivation film 70 electrically connects the test pads 26 and the common electrode pad 29 through the first and second contact holes 72 and 74.

A gate electrode 24, a source electrode 65 and a drain electrode 66 form the three terminals of a TFT (thin film transistor) with a channel formed by the semiconductor layer.

The manufacturing process including the test of the panel is now described with reference to FIGS. 1 and 2.

After the gate and the common electrode wires 22, 24, 26, 27, 28 and 29, the gate insulating film 30, the semiconductor pattern 42, the ohmic contact layer 55 and 56, the data and the pixel electrode wire 62, 65, 66, 67 and 68 are formed, the passivation film 70 is deposited. A photolithography process for defining the separating hole C, and the first and the second contact holes 72 and 74 is performed. Thereafter, the portions of the passivation film 70 and the gate insulating film 30 corresponding to the holes C, 72 and 74 are removed to expose portions the upper layers 202 of the test pads 26 and the common electrode pad 29 as well as the upper layer 202 at the separating hole C. At this time, the gate lines 22 and the test pads 26 are still connected to each other.

Thereafter, the test for detecting the defects of the wires in the LCD panel is performed.

After the test, the exposed portions of upper layers 202 are then removed by using such as aluminum etchant to expose the underlying lower layers 201. A conductive material layer is deposited and patterned to form the connecting members 82, and, at the same time, the exposed portion of the lower layer 201 is removed to form the separating hole C, thereby disconnecting the test pads 26 from the gate lines 22.

However, it is understood that the separation of the gate lines 22 and the test pads 26 are performed by various methods and procedures. Furthermore, the test may be taken before forming contact holes 72 and 74 after the passivation film 70 is deposited.

Next, the structure of the upper panel 1 is described with reference to FIGS. 1 and 2.

On an upper substrate 200, a black matrix 210 of opaque organic material and a plurality of color filters 220 are formed.

The color filters 220 are opposite the pixel area of the lower panel 2, and the black matrix 210 is disposed between the color filters 220 and overlaps the color filters 220 in part.

A liquid crystal layer 3 is interposed between the upper panel 1 and the lower panel 2.

To summarize, one of the feature of this embodiment is that the test pads 26 are disconnected to the gate lines 22 and another is that the test pads 26 are connected to the common electrode pad 29. The disconnection from the gate lines 22 prevents the polarization of the black matrix 210 to reduce the interference by the polarization. The connection to the common electrode pad 29 causes the test pad 26 to be applied with the common voltage, which is also applied to the common electrode lines 27 and their branch electrodes 28, and thus the local polarization in the black matrix 210 due to the test pad 26 is similar to that due to common electrode wire 27 and 28 in the pixels. Accordingly, there is no distortion in the electric fields in the pixel near the test pads 26, thereby reducing light-leakage.

Figure 3:
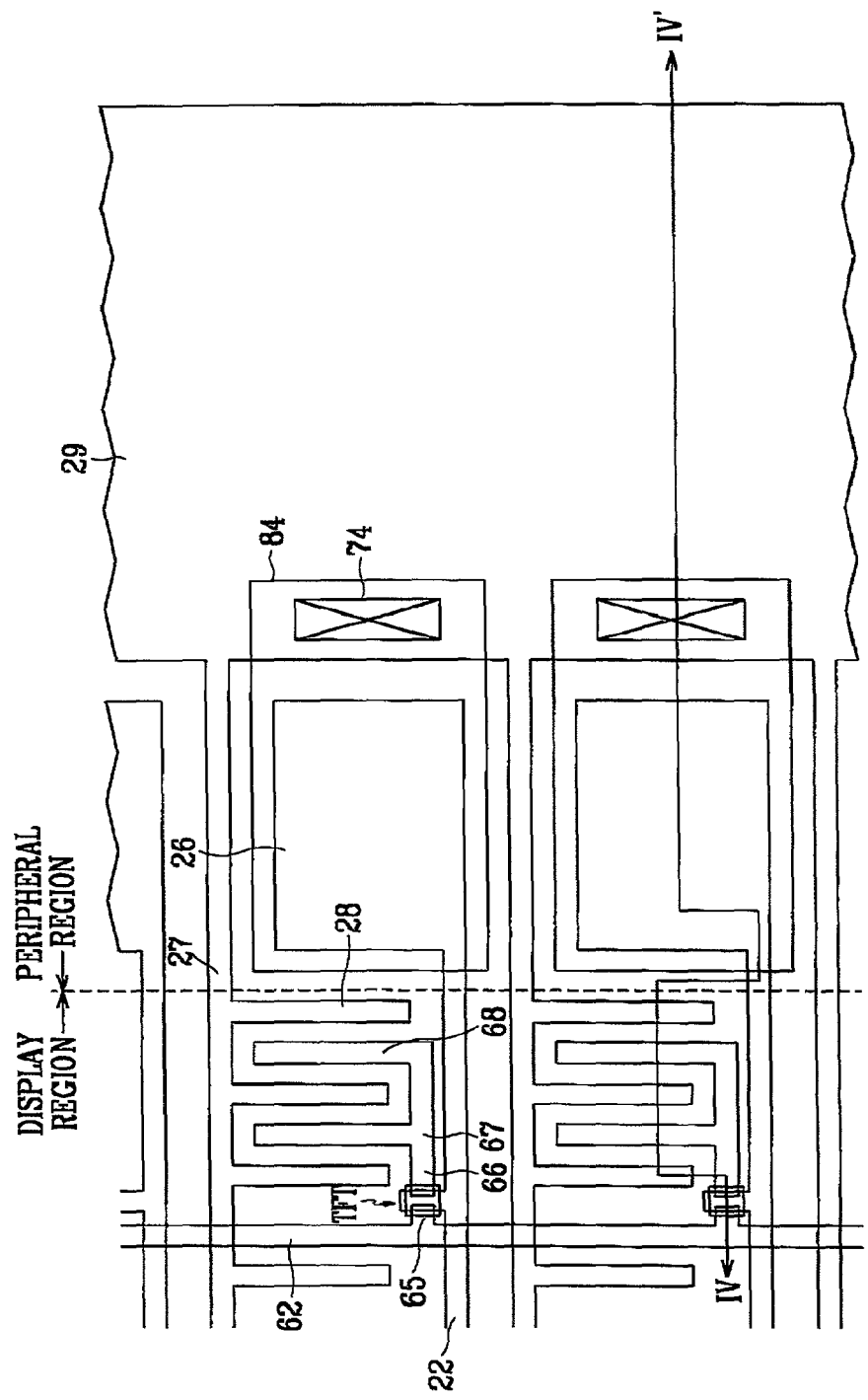
FIG. 3 is a layout view showing a liquid crystal display according to a second preferred embodiment of the present invention.
Figure 4:
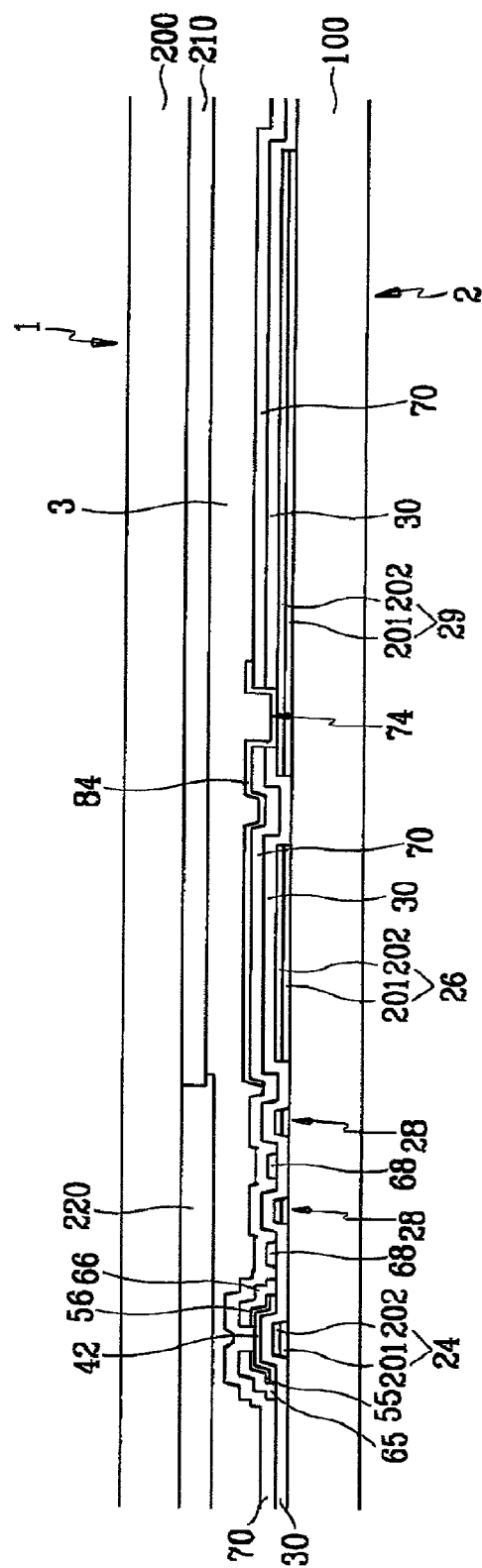
FIG. 4 is a cross-sectional view of an LCD taken along the line IV–IV' in FIG. 3.

FIG. 3 is a layout view of a lower panel of an LCD according to a second preferred embodiment of the present invention, and FIG. 4 is a cross-sectional view of the LCD taken along the line IV–IV' in FIG. 3.

The structure of the LCD according to the second preferred embodiment of the present invention is almost the same as that according to the first embodiment, but differs therefrom in that each test pad 26 is still connected to a respective gate line 22 and fully covered with a respective shielding conductor 84. Although the shielding conductors 84 are connected to a common electrode pad 29 via respective contact holes 74 as in the first embodiment, they are not connected to the test pad 26, which is different from the first embodiment. In this embodiment, since the contact holes 74 expose an upper layer 202 of the common electrode pad 29, the shielding conductors 84 contact the upper layer 202. However, the contact structure may be the same as that of the first embodiment. In addition, the test pads 26 may be disconnected to the gate lines 22 as in the first embodiment.

Accordingly, the electric field from the test pads 26, although applied with the gate voltages including the gate off voltage, is blocked by the shielding conductors 84 and thus does not affect the field in the pixels adjacent to the test pads 26.

Another alternative approach for reducing the interference by the electric field from test pads is that, the test pads, even though connected to gate lines, are located sufficiently far from adjacent pixels.

More specifically, the distance between the test pads and the pixels adjacent to the test pads are preferably equal to or more than twice of the width of the pixel, for example, 200 microns.

According to the present invention as described above, light-leakage phenomena caused by distortion of electric field is prevented and stable image quality is obtained by disconnecting the test pads from the gate lines and connecting them to the common voltage, by covering the test pads with conductors of the common voltage, or locating the test pads far from the adjacent pixels. Furthermore, the present invention can be also applied to the conventional LCD where two field generating electrode are provided on the upper and the lower panels, respectively. In this case, there is no polarization on the upper panel since the upper panel is almost entirely covered with a single large common electrode, and thus the advantage is less than the CE mode LCD.

What is claimed is:

1. A liquid crystal display, comprising:
   a plurality of pixels, wherein each pixel includes first and second field generating electrodes that generate electric fields to control liquid crystal materials and the second field generating electrodes are applied with a common voltage;
   a first signal wire transmitting scanning signals to the pixels;
   a second signal wire transmitting image signals to the pixels; and
   a plurality of test pads for inspecting defects of at least the first signal wire,
   wherein at least one of the test pads is disconnected from the first signal wire and connected to the common voltage.

2. The liquid crystal display of claim 1, wherein the first and the second field generating electrodes are located on a same substrate as the test pads.

3. The liquid crystal display of claim 1, wherein each pixel further includes a switching element, the switching element is electrically connected to the first signal wire, the second signal wire, and the first field generating electrodes.

4. The liquid crystal display of claim 1, wherein a distance between the test pad and the pixels adjacent to the test pad ranges from about 200 microns or larger.

5. The liquid crystal display of claim 1, wherein the plurality of test pads are covered with a shielding member capable of being applied with the common voltage.

6. The liquid crystal display of claim 1, wherein the plurality of test pads are arranged at a distance from an adjacent pixel greater than about 50 microns.

7. A liquid crystal display, comprising:
   a plurality of pixels, wherein at least one of the plurality of pixels includes a first field generating electrode and a second field generating electrode that generates electric fields to control liquid crystal materials and the second field generating electrode is applied with a common voltage and the first generating electrode and second generating electrode are formed on a first substrate;

a first signal wire transmitting scanning signals to the pixels;

a second signal wire transmitting image signals to the pixels; and a plurality of test pads for inspecting defects in the first signal wire, wherein the test pads are disconnected from the first signal wire.

8. A liquid crystal display panel, comprising:

a substrate;

a plurality of pixel electrodes on the substrate;

a plurality of common electrodes on the substrate, wherein the common electrodes cooperate with the pixel electrodes to generate electric fields for controlling liquid crystal materials;

a plurality of gate lines on the substrate that transmit gate signals;

a plurality of data lines on the substrate that transmit data signals;

a plurality of switching elements, wherein at least one of the plurality of switching element is electrically connected to one of the gate lines, one of the data lines, and one of the pixel electrodes; and a plurality of test pads, wherein at least one of the test pads is disconnected from the gate line and connected to a common voltage.

9. The liquid crystal display panel of claim 8, wherein at least one of the plurality of test pads is formed from a same layer as the plurality of gate lines.

10. The liquid crystal display of claim 9, further comprising a common electrode pad connected to at least one of the plurality of common electrodes, wherein the test pad is electrically connected to the common electrode pad capable of receiving the common voltage.

11. The liquid crystal display of claim 10, further comprising a connecting member electrically connecting the test pad to the common electrode pad.

12. The liquid crystal display of claim 11, further comprising an insulating layer covering the test pad and the common electrode pad, wherein the insulating layer includes first and second contact holes exposing a portion of the test pad and the common electrode pad, and wherein the connecting member is connected to the test pad and the common electrode pad through the first and the second contact holes.

13. The liquid crystal display of claim 9, wherein a shielding member is applied with the common voltage.

14. The liquid crystal display of claim 13, further comprising a common electrode pad connected to the common electrodes, wherein the shielding member is electrically connected to the common electrode pad.

15. The liquid crystal display of claim 14, further comprising an insulating layer covering the test pad and the common electrode pad and having a contact hole exposing the common electrode pad, wherein the shielding member is connected to the common electrode pad through the contact hole.

16. The liquid crystal display of claim 8, wherein the plurality of test pads are covered with a shielding member.

17. The liquid crystal display of claim 8, wherein the shielding member minimizes electric fields generated from the common electrodes and minimize adverse effects to the pixel region.

* * * * *